United States Patent [19]

Miller et al.

[11] 4,054,418

[45] Oct. 18, 1977

[54] CATALYTIC ABATEMENT SYSTEM

[75] Inventors: Steven T. Miller, Wilmington, Del.; William G. Hardison, Orangeburg, S.C.

[73] Assignee: E. I. Du Pont de Nemours and Company, Wilmington, Del.

[21] Appl. No.: 630,408

[22] Filed: Nov. 10, 1975

[51] Int. Cl.² .................. B01J 8/02; B01J 35/04; F01N 3/10; F01N 3/15

[52] U.S. Cl. .................. 23/277 C; 23/288 F; 23/288 FB; 23/288 FC; 60/297; 60/303; 60/315; 110/8 A

[58] Field of Search ........ 23/288 F, 288 FB, 288 FC, 23/277 C; 60/295, 297, 301, 299, 303; 110/8 A

[56] References Cited

U.S. PATENT DOCUMENTS

| | | | |
|---|---|---|---|
| 1,848,990 | 3/1932 | Boyd et al. | 23/277 C |
| 2,777,759 | 1/1957 | Sokolik | 23/288 FB UX |
| 3,228,755 | 1/1966 | Lohinville | 23/288 F UX |
| 3,397,154 | 8/1968 | Talsma | 23/288 FB |
| 3,468,634 | 4/1969 | Pauletta | 23/277 C X |
| 3,668,839 | 6/1972 | Misurek | 23/277 C X |
| 3,806,322 | 4/1974 | Tabak | 23/288 F X |
| 3,898,040 | 8/1975 | Tabak | 23/277 C |

*Primary Examiner*—Morris O. Wolk
*Assistant Examiner*—Michael S. Marcus

[57] ABSTRACT

An apparatus for the thermal-catalytic abatement of hydrocarbons, carbon monoxide, nitrogen oxides and particulates from effluent gas streams. The apparatus has a preheat section wherein the effluent is heated to 400°–1000° F by hot combustion gases. The effluent and combustion gases are directed by a baffle through a filter where combustible particulates are incinerated and noncombustible particulates are collected. The baffle followed by a diffuser cone, axially located on the filter, intimately mixes the effluent with the combustion gases so as to provide uniform flow and temperature distribution of the mixed gases across the filter. The filtered gases then pass through a catalytic reactor section containing a catalyst, preferably catalyst-coated ceramic honeycombs. In the presence of the catalysts the hydrocarbons and carbon monoxide in the heated gas stream are oxidized to carbon dioxide and water and the nitrogen oxides are reduced.

3 Claims, 2 Drawing Figures

U.S. Patent  Oct. 18, 1977  4,054,418
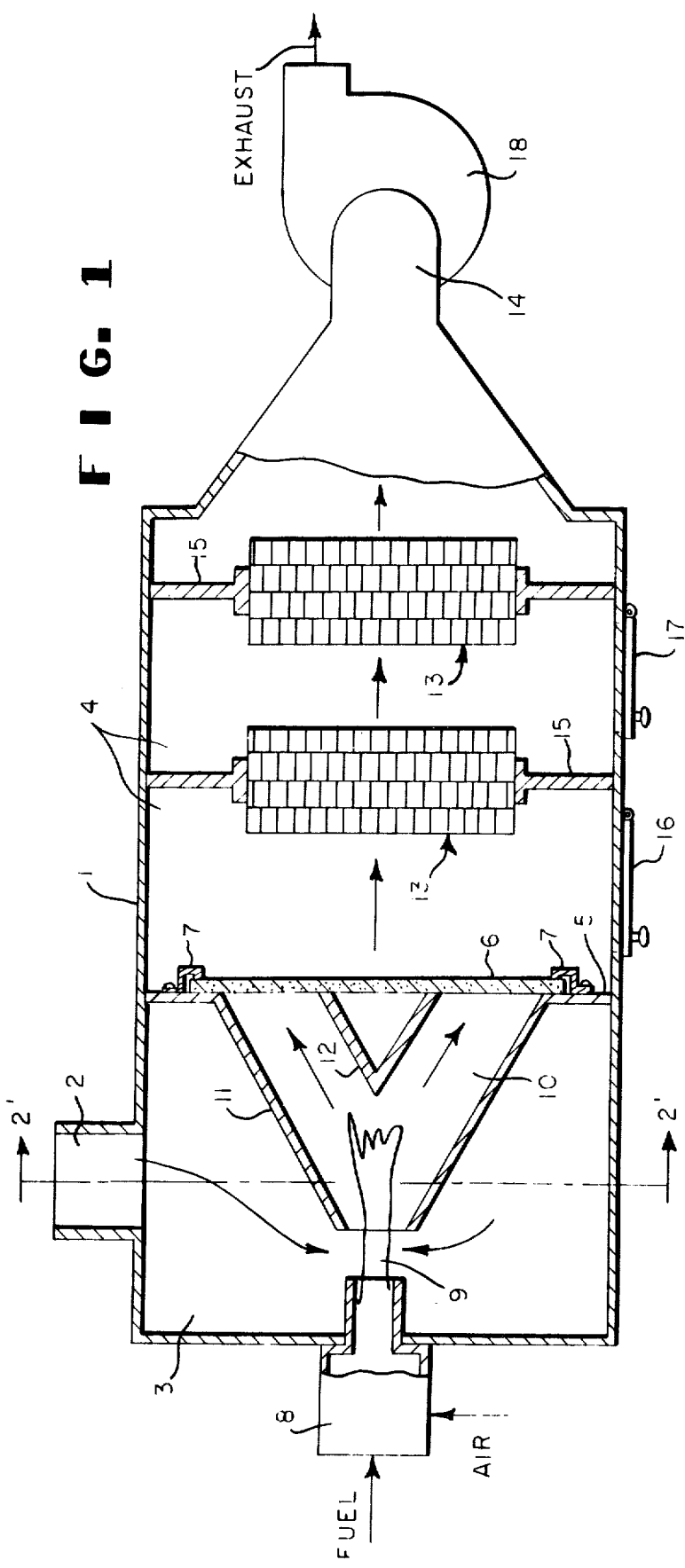
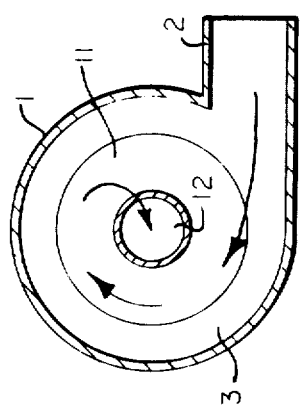

CATALYTIC ABATEMENT SYSTEM

BACKGROUND OF THE INVENTION

1. Field of the Invention

This invention relates to an apparatus for the removal of undesirable components from effluent gases. The apparatus removes these components by filtration, combustion and catalytic oxidation and reduction.

2. Brief Description of the Prior Art

Many devices have been designed for the incineration or catalytic abatement of effluent gases. Examples of such devices are illustrated by the following patents.

U.S. Pat. No. 3,472,498 discloses an incinerator wherein exhaust gases are introduced into a combustion chamber, mixed with a combustible gas and ignited. The gases are retained in the combustion chamber for sufficient time to insure complete incineration and then withdrawn by an impeller.

U.S. Pat. No. 3,881,870 also discloses an incinerator. This incinerator contains a baffle in the firing chamber for increasing the efficiency of combustion by providing better mixing and increased retention of the contaminated effluent within the firing chamber.

U.S. Pat. Nos. 3,806,322 and 3,898,040 disclose an incinerator that removes contaminants from gases by incineration and/or catalytic oxidation. The incinerator has a central combustion chamber wherein the effluent gas is contacted with hot combustion gases and the mixture thereafter passes through a catalytic element prior to being exhausted from the unit.

SUMMARY OF THE INVENTION

The invention is an apparatus for removing hydrocarbons, carbon monoxide, and particulates from an effluent gas stream. The apparatus can also be used to remove nitrogen oxides from effluents by catalytic reduction. The apparatus contains the following elements:

an elongated housing divided into a preheat section and a catalytic reactor section by a filter means which forms a passageway between the sections, said housing having an inlet for the effluent gas stream in the preheat section adjacent one end of the housing, and an exit for treated gas in the catalytic reactor section at the opposite end of the housing, burner means positioned at the inlet end of the housing for discharging hot combustion gases into the preheat section, a frustum-shaped baffle in the preheat section for mixing the hot combustion gases with the effluent gas stream and directing the flow of the mixed gases toward the filter means and providing a surface for radiating heat toward the filter means, a diffuser cone axially located on the filter means for further mixing of the combustion gases and the effluent gas stream to provide for the uniform distribution of the flow and the temperature of the mixture of gases across the filter means, said filter means providing a heated barrier for incinerating combustible particulates and removing noncombustible particulates from the mixture of gases, a catalyst module located within said catalytic reactor section such that the mixture of gases passes therethrough in flowing toward the exit, the catalyst module containing an oxidation catalyst for oxidizing hydrocarbons and carbon monoxide and/or a reducing catalyst for reducing nitrogen oxides, preferably the catalytic module is composed of a ceramic honeycomb having the catalyst deposited upon its exposed surfaces, and a blower means for removing the mixture of gases through the preheat and catalytic reactor sections.

In an optional embodiment the treated gases exiting from the apparatus are fed into a heat exchanger to preheat the effluent gases being fed into the inlet.

The apparatus of the invention has the advantages that it can incinerate most organic particulates, i.e., lint and char, and can remove noncombustible particulates from the gas stream. This feature is significant as these particulates should be removed before the gas stream is introduced into the catalyst module; otherwise, binding of the catalyst or plugging of the catalyst support could occur. Furthermore, the apparatus also provides a uniform flow and temperature distribution of the gases across the filter and into the downstream catalytic reactor.

BRIEF DESCRIPTION OF THE DRAWING

FIG. 1 is a side elevational view, partly in cross section, of the apparatus of the invention.

FIG. 2 is a cross section view along line 2'—2' of FIG. 1 illustrating an optional embodiment of the invention wherein a tangential inlet is employed.

DESCRIPTION OF THE INVENTION

The apparatus of the invention will now be described in detail, particularly with reference to the Figures.

The effluent gas stream to be fed into the apparatus can come from any source and be at any temperature from ambient to 1000° F or more. The content of the effluent gas stream is not critical as the apparatus can remove combustible and noncombustible particulates, hydrocarbons, nitrogen oxides and carbon monoxide from the stream. Furthermore, the gas stream need not contain all these contaminants; and the apparatus can be used to treat gas streams containing only hydrocarbons, or carbon monoxide, or only combustible particulates. However, in view of the versatility of the apparatus, effluents containing hydrocarbons, carbon monoxide and particulates are particularly suitable. If the effluent does not contain sufficient oxygen for oxidizing all the hydrocarbons or carbon monoxide present, air or oxygen can be added to the effluent either prior to or after entering the housing. When the apparatus is used to reduce nitrogen oxides, if sufficient reductant, i.e., methane, ammonia, hydrogen and the like, are not present in the effluent, they should be added.

Typical gas streams to be treated by the apparatus of the invention include off-gases from drying ovens, off-gases from plywood veneer driers, food processing ovens, chemical plant tail gases, flue gases from power boilers, textile processing ovens, off-gases from metal coating and decorating lines, paint-baking ovens, and the like.

The effluent is fed into the housing 1 of the apparatus through an inlet 2. In some embodiments it may be desirable to preheat the effluent prior to entering the inlet. This can be accomplished by any conventional means such as a preheater. In a preferred embodiment the effluent is heated in a conventional heat exchanger, not illustrated, through which the treated gases flow after exiting from the apparatus.

In some embodiments it will be desirable to employ a tangential inlet as illustrated in FIG. 2. This type of inlet provides for additional turbulence in the effluent, thus promoting mixing.

The housing 1 is divided into two sections, a preheat section 3 and a catalytic reactor section 4. The two sections are separated by a partition 5 to which a filter means 6 is attached by any suitable means, e.g., metal clips 7. The filter forms a passageway between the two sections. The housing will usually be in the shape of a cylinder, although this is not necessary.

The effluent passes through the inlet 2 into the preheat section 3. Located at one end of the preheat section is a burner means 8. The burner is conventional and is fired with a fuel, e.g., natural gas, propane, or distillate fuel oil, and air from either an outside source or that present in the effluent, and should be capable of heating the effluent to temperatures up to 1000° F or more. The exact temperature produced by the burner will be dependent upon the undesired contaminants present in the effluent and can be regulated by controlling the fuel or air or both into the effluent. The burner discharges a flame 9 or hot combustion gases axially into the preheat section.

The hot combustion gases are discharged into a mixing chamber 10 formed by a baffle 11, the filter 6 and a diffuser cone 12 located axially on the filter. The baffle 11 is in the shape of a hollow frustum with its smaller opening nearest to the burner means and its larger opening adjacent the filter. The apex of the diffuser cone 12 is within the mixing chamber and its base rests on the filter 6.

The effluent is pulled into the mixing chamber by a blower 18 which is located at the gas exit 14 from the housing. The arrows illustrate the direction of gas flow. This blower can be driven by any conventional drive means, e.g., an electric motor with a belt drive. The blower need not be located at the exit to the housing, in some embodiments it may be desirable to have the blower located at or near the inlet and serve to push the mixture of gases through the housing.

As the effluent and hot combustion gases enter the mixing chamber, the diffuser cone 12 and the turbulence created by the shape of the baffle 11 force the gases to mix. The baffle 11 also serves to direct the mixture of gases toward the filter and provides a surface for radiating heat toward the filter. The diffuser cone 12 also serves to uniformly distribute the gas flow across the filter. The cone and the baffle should be impervious to the flow of gases.

The hot combustion gases leaving the burner form a flame 9 which also provides a surface at high temperatures for radiating heat toward the filter. The temperature of the flame and its distance from the filter influence the amount of heat radiated to the filter, and thus the filter's surface temperature.

The filter 6 can be any filter that is capable of being exposed to temperatures up to 1500°-1750° F. The filter size is not critical; it will depend upon the nature of the particulates to be removed from the effluent. In typical embodiments the filter will have mesh sizes ranging from 5-100 (U.S. Standard).

In operation the filter provides a high temperature (typically 1000°-1500° F) surface upon which the combustible particulates, e.g., lint, in the effluent are impinged and incinerated. The high surface temperature is obtained by radiant heat transfer from the hot combustion gases 9 and the wall of the baffle 11. As previously set forth, this surface temperature can be controlled by adjusting the feeds to the burner means.

The filter also acts as a barrier for any noncombustible particulates present in the effluent, e.g., fiberglass. Removal of particulates is desirable to avoid blinding of catalyst or plugging of catalyst or catalyst support in the catalyst module 13 located in the downstream catalytic reactor section 4.

After passing through the filter, the mixture of effluent and combustion gases enters the catalytic reactor section 4. This section will contain one or more modules 13 containing a catalyst. In the preferred embodiment of the invention the modules contain ceramic honeycombs having oxidation and/or reduction catalysts on their exposed surfaces. In other embodiments it may be desirable to use modules containing the catalyst in the form of gauzes, woven screens, pellets, or the like. The exact form of catalyst used is not critical as long as the mixture of gases can flow through it.

In operation as the heated gases pass through the catalyst module, the hydrocarbon and any carbon monoxide present come into contact with the oxidation catalyst and are oxidized to carbon dioxide and water or other combustion products. Any nitrogen oxide present can be contacted with a reduction catalyst and thus reduced.

The catalyst modules will be installed on frames 15 within the housing and can be attached thereto in any convenient manner. The attachment should be such that an essentially air-tight seal is formed, thus insuring that the mixture of gases passes through the catalyst in the module on its way to the exit 14.

The use of catalyst modules, i.e., a housing open to gas flow on two opposite ends and containing the catalyst, has the advantage in that modules are easily removed for cleaning and/or replacement. In the preferred embodiment the catalyst module will be two more slabs of catalyst-coated ceramic honeycombs. When two or more slabs of the honeycomb are employed, the cell opening in the different slabs will not be in alignment. The nonalignment will create a turbulence in the gases flowing through the cells, thus providing better contact with the catalyst.

A door 16 is located in the housing to provide access to the filter and the catalyst modules. This is desirable as during use the filter will collect non-combustible particulates; and from time to time the filter must be removed from the apparatus for cleaning or replacement. This door or another door 17, located in the housing, also permits access to the catalytic modules so they can be cleaned or replaced when necessary.

As previously mentioned, a blower 18 moves the mixture of effluent and combustion gases through the housing. The exhaust from the apparatus, i.e., the treated gas, can be discharged to the atmosphere through a stack or the like. Or in a preferred embodiment, it is fed to a heat exchanger wherein it is used to heat the effluent feed for the apparatus.

In other embodiments the treated gas could be used for heating make-up air for different processes or for space heating; it could be recycled to the process producing the effluent; it could be used to heat liquids, e.g., water or heat transfer liquids; or it could be fed to waste heat boilers to produce steam. Other uses are also possible wherein a clean, hot gas stream is desired.

The apparatus of the invention can be constructed from conventional materials of construction. Thus the housing, blower and frames can be made of carbon steel or, if temperatures above 800° F are employed, of stainless steel. The filter, baffle and diffuser cone, in view of the temperatures, will preferably be made of stainless steel. In some embodiments it may be desirable to make one or more elements from high temperature alloys. In some embodiments wherein the effluent gas is corrosive, stainless steel or other corrosion-resistant materials may need to be used for all the parts of the apparatus exposed to the gases.

The ceramic honeycombs employed in the preferred catalyst modules can be any of the ceramic honeycombs presently commercially available. Particularly useful are the thin-walled ceramic honeycombs made by the process of U.S. Pat. Nos. 3,255,027 and 3,473,987. These alpha-alumina and mullite honeycombs are commercially available under the name "Torvex" ceramic honeycomb.

In other embodiments the catalyst employed in the module can be in the form of gauzes, foils, pellets, wires, and the like. When pellets are used, the catalyst will usually be in the form of a pellet of alumina, silica, or the like having a coating of catalytic metal on its surface. These pellet catalysts can be contained within the module by use of screens.

The catalyst modules will contain an oxidation or reduction catalyst that is exposed to the gases. This catalyst can be any oxidation catalyst, for example, a precious metal such as ruthenium, rhodium, palladium, platinum or mixtures thereof, or various metallic oxides, i.e., the oxides of iron, cobalt, nickel, manganese, chromium, copper, zinc or the rare earths or mixtures thereof. In view of their high catalytic activity, for most embodiments the use of platinum or palladium will be preferred. Likewise, any reduction catalyst employed for the reduction of nitrogen oxide can be employed, e.g., a precious metal catalyst. In some instances the same catalytic metal can serve both as the oxidation and reduction catalyst, e.g., platinum.

The oxidation catalysts can be applied to their support, e.g., the ceramic honeycomb, in any conventional manner. Thus, the techniques disclosed in U.S. Pat. Nos. 2,580,806; 2,921,035 or 3,554,929 can be employed to apply the catalysts to ceramic honeycomb.

The apparatus of the invention has many advantages as previously set forth. One further advantage is that the design of the catalyst modules provides high gas turbulence, thus promoting the oxidation of hydrocarbons at relatively low operating temperatures. This feature in turn results in requiring lower fuel input than thermal incineration and at the same time inhibiting the formation of nitrogen oxides.

We claim:

1. In a catalytic thermal incinerator for removing undesirable components from an effluent gas stream having an elongated housing divided into a preheat section and a catalytic reactor section by transverse filter means, burner means positioned at an end of said housing to discharge hot burner gases axially into said preheat section, effluent gas inlet means connected to said preheat section.

at least one transverse catalyst module in the catalytic reactor section, gas outlet means downstream of the catalyst module connected to said catalytic reactor section and blower means for moving gases through the housing, the improvement comprising:

in the preheat section a hollow frusto-conical baffle open at its smaller end and secured at its larger end to the transverse filter, said filter being provided with a diffuser cone secured at its base to the filter and oriented coaxially with said frusto-conical baffle, thereby forming an annular passage in which gases are mixed to give uniform distribution of heat and flow of the gases at the catalyst.

2. The apparatus of claim 1 wherein the catalyst module contains a ceramic honeycomb having deposited on its exposed surfaces an oxidation catalyst.

3. The apparatus of claim 2 wherein the catalyst module contains two or more slabs of catalyst-coated ceramic honeycomb in nonaligned contact.

* * * * *